United States Patent [19]

Yano et al.

[11] Patent Number: 4,480,316
[45] Date of Patent: Oct. 30, 1984

[54] RULED LINE PRINT CONTROL SYSTEM IN A WORD PROCESSING APPARATUS

[75] Inventors: Tomoyuki Yano, Yamatokoriyama; Hiroki Maruido, Tenri, both of Japan

[73] Assignee: Sharp Kabushiki Kaisha, Osaka, Japan

[21] Appl. No.: 415,416

[22] Filed: Sep. 7, 1982

[30] Foreign Application Priority Data

Sep. 11, 1981 [JP] Japan ................................ 56-144377

[51] Int. Cl.³ .............................................. G06S 3/12
[52] U.S. Cl. .................................................. 364/900
[58] Field of Search ......................... 364/900 MS File; 400/17

[56] References Cited

U.S. PATENT DOCUMENTS 4,159,882  7/1979  Sanders, Jr. et al. ........... 364/900 X
4,282,583  8/1981  Khan et al. ......................... 364/900

*Primary Examiner*—Raulfe B. Zache
*Attorney, Agent, or Firm*—Birch, Stewart, Kolasch & Birch

[57] ABSTRACT

A word processing apparatus includes a print control system for printing a horizontal ruled line and a vertical ruled line in addition to characters. The vertical ruled line is printed on a character print line. When the vertical ruled line becomes discontinuous due to a long distance provided between two character print lines, an interpolation line is printed in order to provide a continuous vertical ruled line.

6 Claims, 10 Drawing Figures

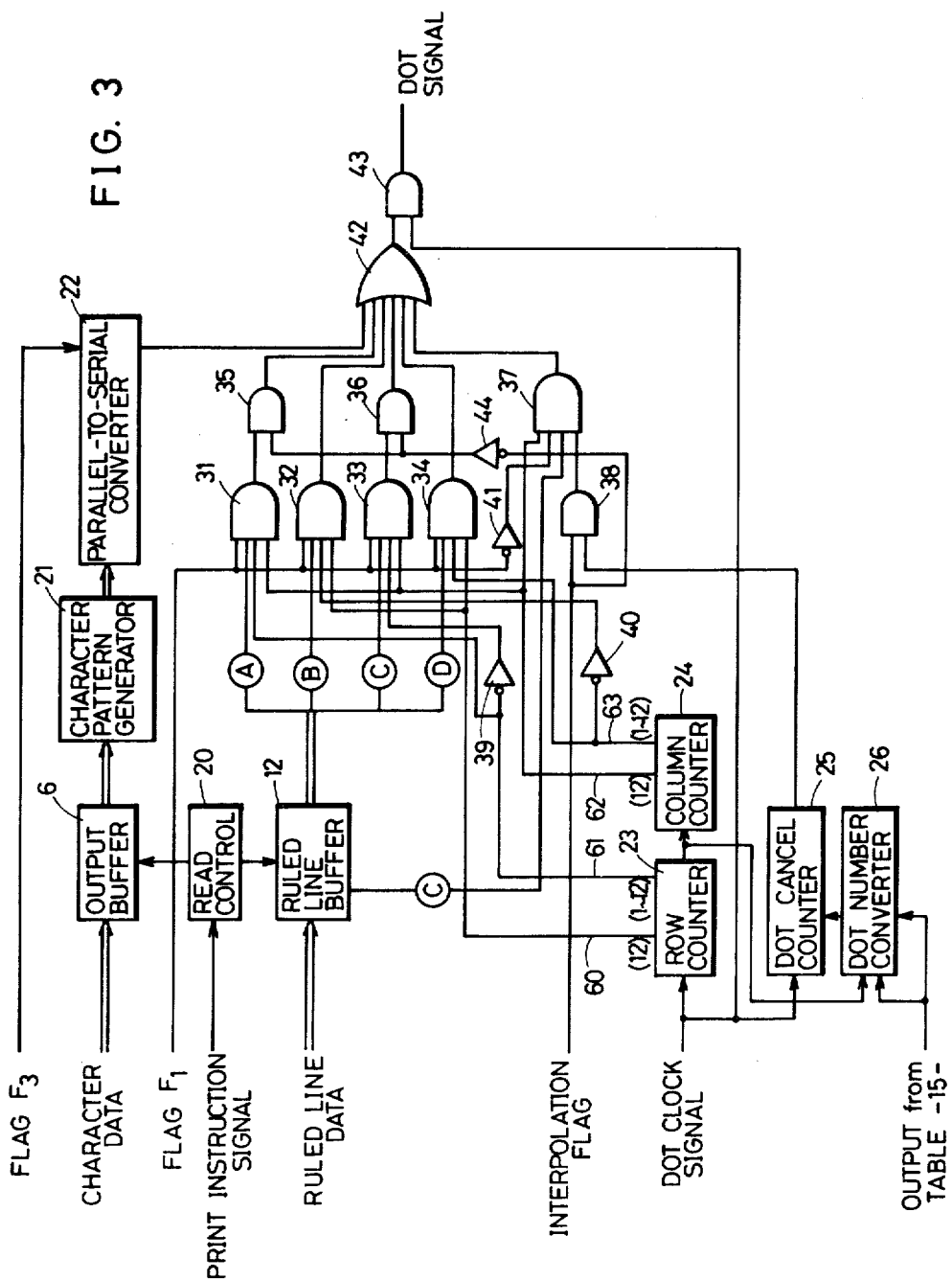

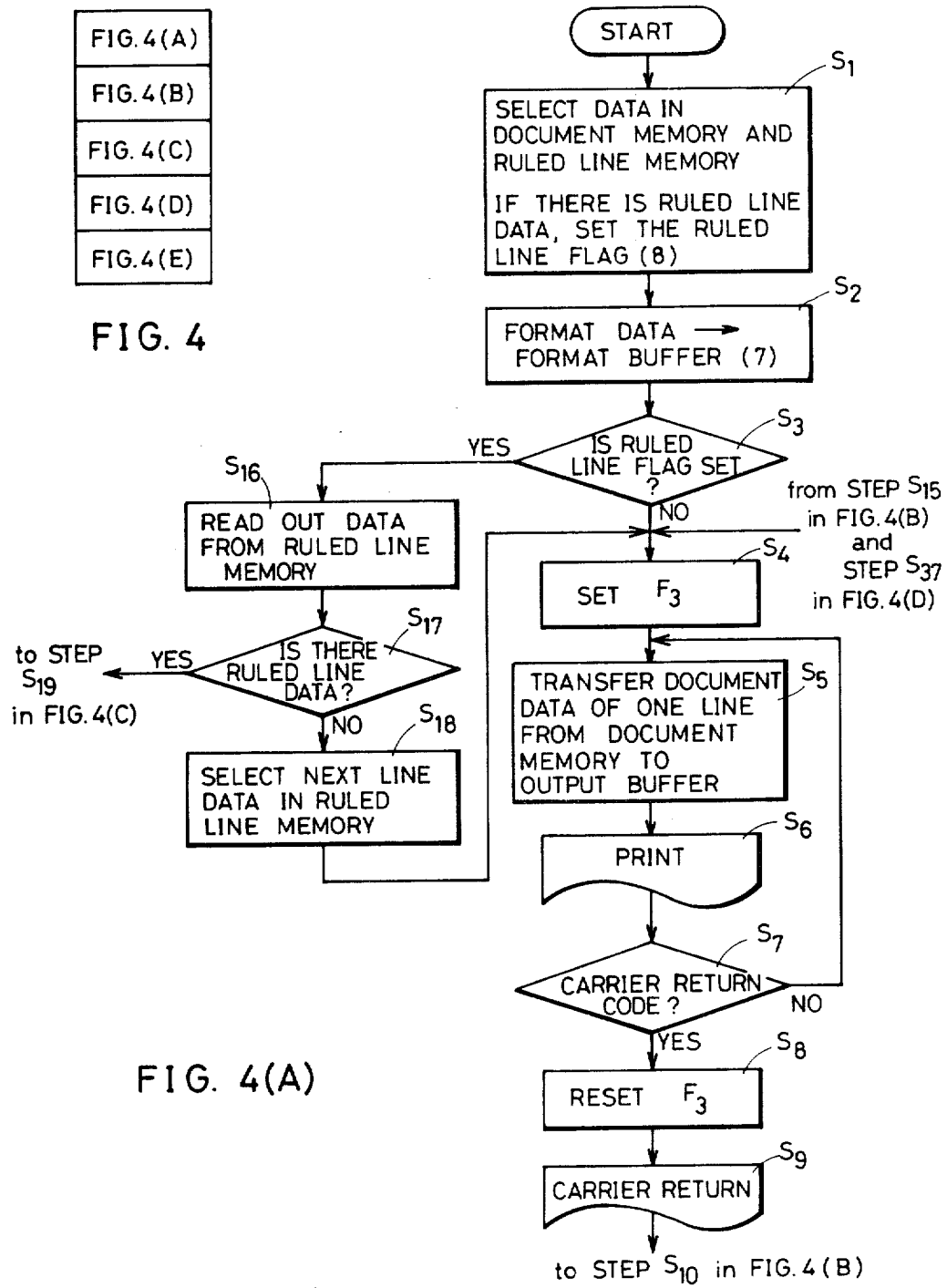

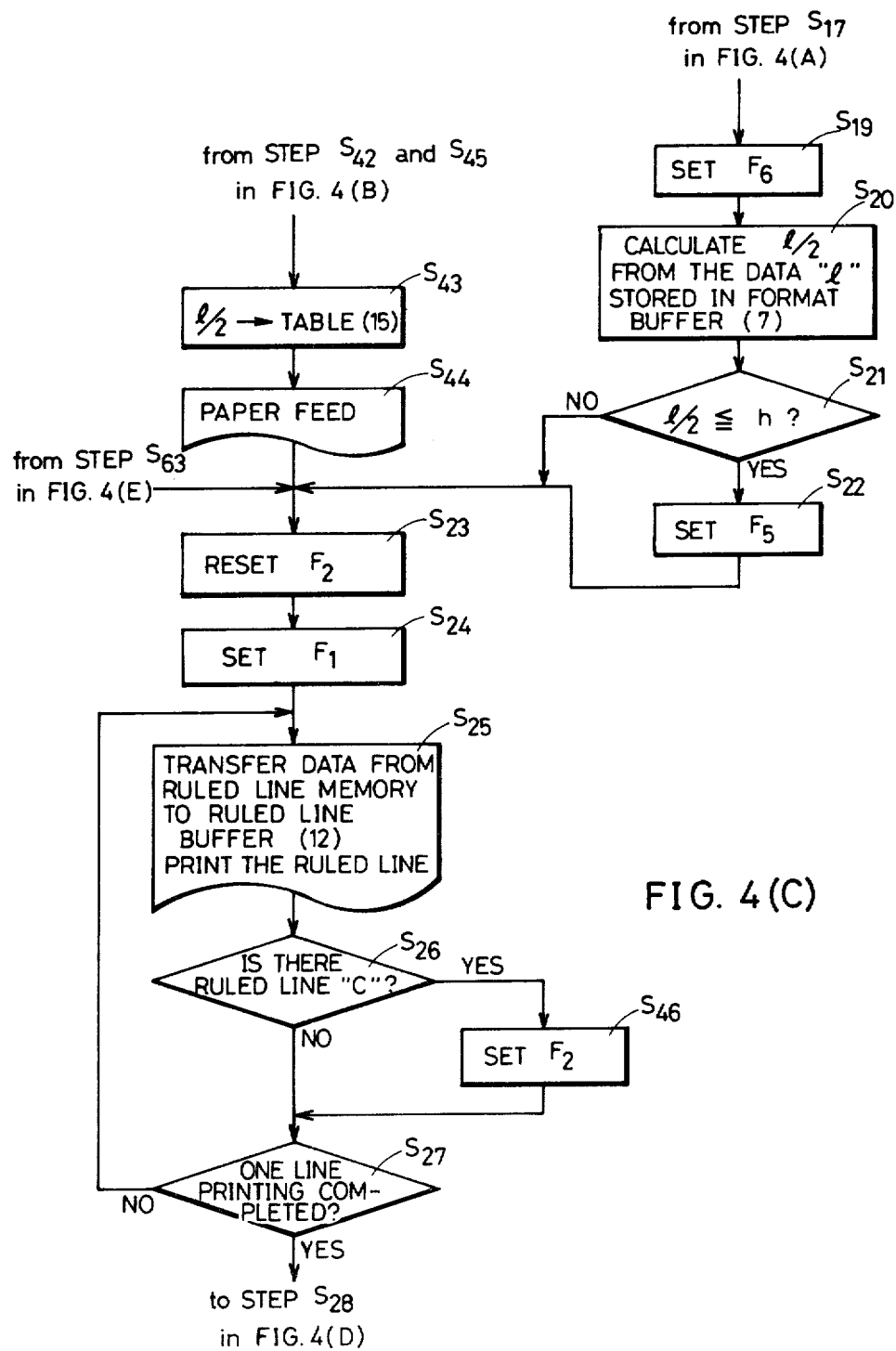

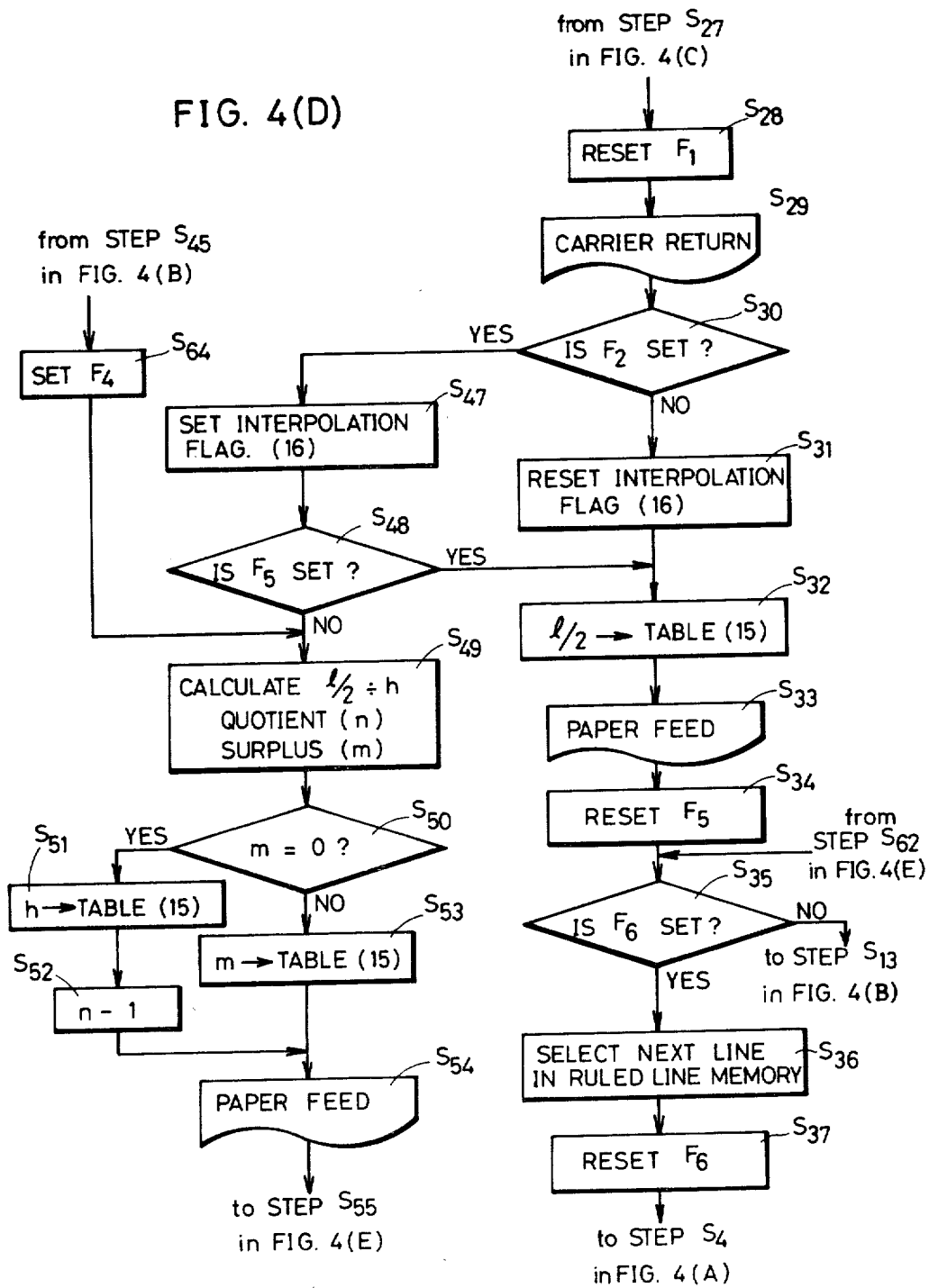

RULED LINE PRINT CONTROL SYSTEM IN A WORD PROCESSING APPARATUS

BACKGROUND AND SUMMARY OF THE INVENTION

The present invention relates to a print control system in a word processing apparatus which includes a dot matrix printer.

The present invention relates, more particularly, to a print control system for printing ruled lines in a word processing apparatus which includes an ink jet system printer.

Generally, the Japanese language word processing apparatus includes a dot matrix printer such as a wire dot printer or an ink jet system printer, wherein 24×24 dot positions are assigned to form one character pattern. Ruled lines are also formed through the use of the 24×24 dot matrix pattern. An example of a ruled line forming system is disclosed in copending application Ser. No. 359,290, "RULED LINE TREATMENT IN A WORD PROCESSING SYSTEM" filed on Mar. 18, 1982 by Tomoyuki YANO and assigned to the same assignee as the present application.

Usually, in such a word processing apparatus, the line space is selected at a desired value through the use of a keyboard panel. When the line space is selected at a longer value, there is a possibility that a vertical ruled line becomes discontinuous because the printing region is limited to the 24×24 dot positions.

Accordingly, an object of the present invention is to provide a print control system in a dot matrix printer, which ensures accurate formation of a vertical ruled lines.

Another object of the present invention is to provide a ruled line print control system in a word processing apparatus which includes an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an interpolation system is provided to form continuous vertical ruled lines. When the line space is greater than a preselected value, the interpolation system is activated to print an interpolation vertical line between the normal vertical ruled lines which are separated from each other.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is a detailed block diagram of a dot control circuit included in the word processing apparatus of FIG. 1;

FIGS. 4, 4A to 4E are a flow chart for explaining an operational mode of the word processing apparatus of FIG. 1.

DESCRIPTION OF THE PREFERRED EMBODIMENTS

Figure 1:
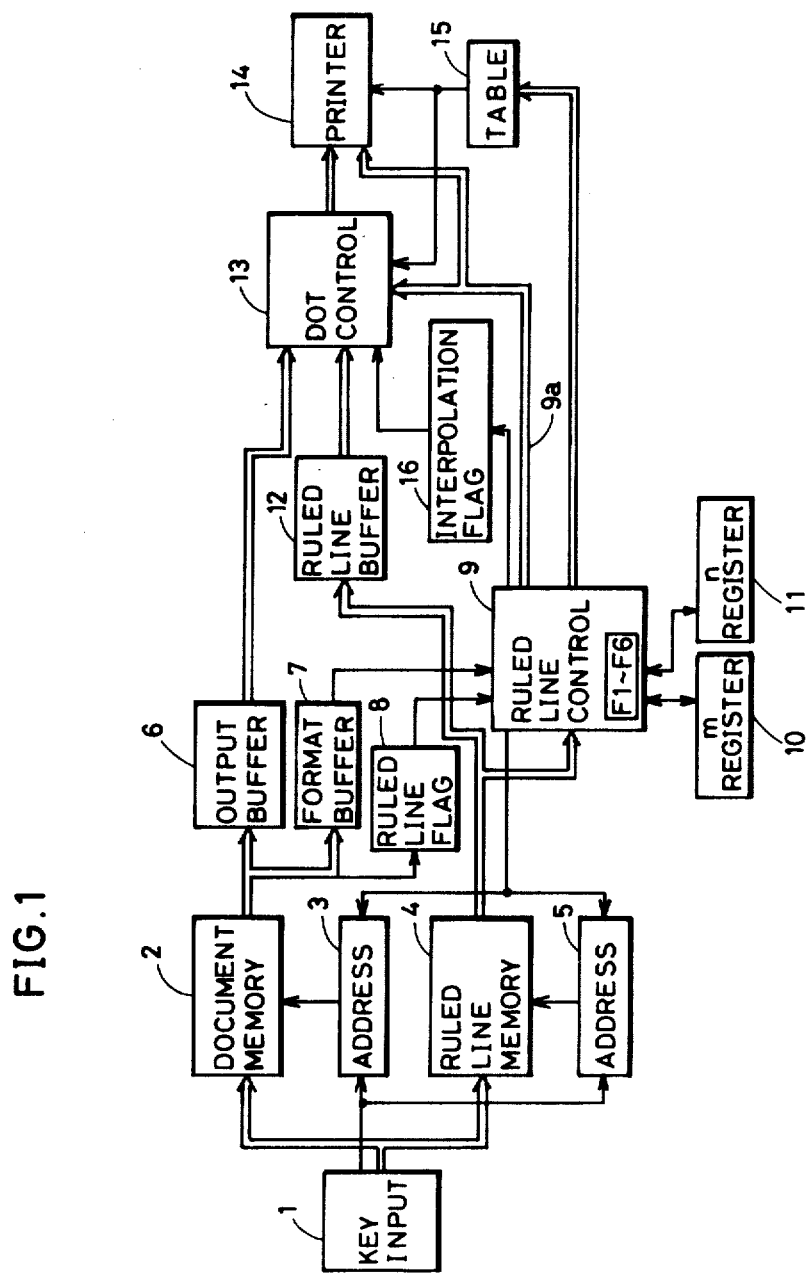
FIG. 1 is a block diagram of an embodiment of a word processing apparatus of the present invention.

The word processing apparatus of FIG. 1 includes a key input panel 1 having numeral keys, character keys and function keys. The document data introduced from the key input panel 1 is applied to a document memory 2, and the ruled line data introduced from the key input panel 1 is applied to a ruled line memory 4. The document memory 2 memorizes the document data in accordance with a predetermined document format. The ruled line memory 4 memorizes the ruled line data in accordance with a predetermined document format. The addresses in the document memory 2 and the ruled line memory 4 correspond to each other. The document memory 2 and the ruled line memory 4 have a memory capacity sufficient for storing the document data and the ruled line data of plural pages, respectively. The document memory 2 memorizes the document data page by page, memorizes a ruled line flag which indicates whether ruled lines should be printed on the page, and memorizes a line space, namely, a distance "l" provided between adjacent two lines. An address circuit 3 is associated with the documant memory 2 in order to select a write in address and a read out address of the document memory 2 in accordance with output signals developed from the key input panel 1 and a ruled line control circuit 9. Another address circuit 5 is associated with the ruled line memory 4 in order to control the read out operation and the write in operation conducted to the ruled line memory 4 in accordance with the output signals developed from the key input panel 1 and the ruled line control circuit 9.

Figure 5:
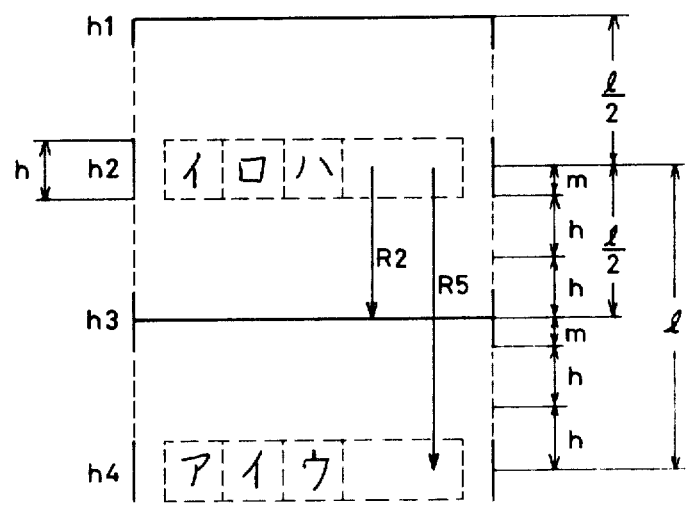
FIG. 5 is a schematic plan view showing an example of a printout for explaining an operational mode of the word processing apparatus of FIG. 1.

The document memory 2 supplies the document data of one line in the selected page to an output buffer 6 in accordance with the instructions developed from the ruled line control circuit 9 and applied through the address circuit 3. Furthermore, the document memory 2 supplies a format buffer 7 with the format data including the above-mentioned distance data "l". Moreover, the document memory 2 develops the ruled line flag information which is applied to and stored in a ruled line flag register 8. The ruled line memory 4 develops the ruled line data line by line in response to the read instructions which are developed from the ruled line control circuit 9 and applied through the address circuit 5, the ruled line data being applied to the ruled line buffer 12 and the ruled line control circuit 9. The ruled line control circuit 9 includes a microcomputer control system for controlling the document print operation and the ruled line print operation in a manner as shown in FIG. 5. The ruled line control circuit 9 includes registers for storing the flags $F_1$ through $F_6$. Registers 10 and 11 are connected to the ruled line control circuit 9, which stores the calculation results of the interpolation operation of the vertical ruled line. An interpolation flag register 16 is connected to the ruled line control circuit 9.

A dot control circuit 13, of which a detailed construction is shown in FIG. 3, develops a dot signal representing a printing dot or a non-printed dot in response to a data $9_a$ (including print instruction signals, carrier return instruction signals, dot clock signals and various flags) developed from the ruled line control circuit 9, and the data developed from the output buffer 6 and the ruled line buffer 12. The thus developed dot signal, represented by the logic values "1" and "0", is applied to a printer 14. The printer 14 is a dot matrix printer such as an ink jet system printer, and functions to print the character and the ruled line on the record receiving paper. A paper feed signal is applied from the ruled line control circuit 9 to the dot control circuit 13 and the printer 14 via a table 15. The printer 14 advances the record receiving paper in the vertical direction in response to the paper feed signal, thereby controlling the line space. The dot control circuit 13 adjusts the length of the interpolation vertical line in response to the paper feed signal.

Figure 2:
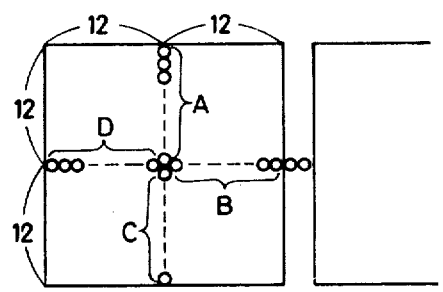
FIG. 2 is a schematic plan view showing a ruled line format printed by the word processing apparatus of FIG. 1.

FIG. 2 shows a format of the ruled line pattern printed by the printer 14. One character occupies 24×24 dot positions. Two dot columns are provided between the adjacent character positions in the horizontal direction in order to determine the character space in the horizontal direction. The ruled line pattern is formed by the combination of vertical ruled line elements A and C, and horizontal ruled line elements B and D. That is, the ruled line data is a four bit data, each bit corresponding to the line elements A, B, C and D.

FIG. 3 shows the dot control circuit 13 in detail. Like elements corresponding to those of FIG. 1 are indicated by like numerals.

A read control circuit 20 is activated by the print instruction signal which is included in the data $9_a$ developed from the ruled line control circuit 9, and functions to output the data stored in the output buffer 6 and the ruled line buffer 12. The character data developed from the output buffer 6 is applied to a character pattern generator 21. The output signal developed from the character pattern generator 21 is applied to a parallel-to-serial converter 22. The parallel-to-serial converter 22 is activated by a flag $F_3$ included in the data $9_a$ developed from the ruled line control circuit 9, and functions to convert the parallel data developed from the character pattern generator 21 into a serial data signal which is applied to an OR gate 42. The ruled line buffer 12 stores the ruled line data applied from the ruled line memory 4. The four bit ruled line data is divided by the ruled line buffer 12 and is applied to AND gates 31, 32, 33 and 34. More specifically, the first bit, representing the ruled line element A, is applied to the AND gate 31. The second bit, representing the ruled line element B, is applied to the AND gate 32. The third bit, representing the ruled line element C, is applied to the AND gate 33. The fourth bit, representing the ruled line element D, is applied to the AND gate 34. The third bit, representing the ruled line element C, is further applied to an AND gate 37.

A 24 bit row counter 23 is provided for determining the dot position in the 24×24 dot matrix pattern. The 24 bit counter 23 counts the dot clock signal (which controls the print timing of each dot in the printer 14) included in the data $9_a$ developed from the ruled line control circuit 9. The 24 bit row counter 23 develops a carry signal when 24 dot clocks are counted. The thus developed carry signal is applied to a 26 bit column counter 24. The 26 bit column counter 24 determines the column dot position in the 24×24 dot matrix pattern. When the contents counted by the row counter 23 reach "12", the row counter 23 develops a signal 60 which is applied to the AND gates 32 and 34. That is, the signal 60 represents the timing at which the ruled line elements B and D are printed. When the count contents are between "1" and "12", the row counter 23 develops a signal 61 which is applied to the AND gate 31 and to the AND gate 33 via an inverter 39. That is, the signal 61 determines the length of the vertical ruled line elements A and C. When the count contents in the column counter 24 become "12", the column counter 24 develops a signal 62 which is applied to the AND gates 31 and 33 and an AND gate 37. That is, the signal 62 represents the timing at which the vertical ruled line elements A and C are printed. The column counter 24 develops a signal 63 while the count contents are between "1" and "12", which is applied to the AND gate 34 and to the AND gate 32 via an inverter 40. That is, the signal 63 functions to determine the length of the horizontal ruled line elements B and D.

A dot number converter circuit 26 is provided for controlling the interpolation printing of the vertical ruled line. More specifically, the dot number converter circuit 26 calculates the inhibition dots in the vertical ruled line in response to the line space signal developed from the table 15. The dot number converter circuit 26 functions to perform the subtraction calculation from the maximum dot number "24" upon every provision of the carry signal from the row counter 23. The subtraction result is preset in a dot cancel counter 25. The dot cancel counter 25 is a counter of radix 24, and functions to count the dot clock signal after the preset number. A carry signal developed from the dot cancel counter 25 is applied to an AND gate 38.

The flag $F_1$ developed from the ruled line control circuit 9 is applied to the AND gates 31, 32, 33 and 34 so that the AND gates 31 through 34 are conductive when the flag $F_1$ is set to print the ruled line data. The AND gate 31 receives the signals 61 and 62 so that the AND gate 31 is conductive during generation of a timing signal to form the vertical ruled line element A. The AND gate 32 receives the signal 60 and the inverted signal of the signal 63 and, therefore, the AND date 32 is open during generation of the timing signal to print the horizontal ruled line element B. The AND gate receives the signal 62 and the inverted signal of the signal 61 so that the AND gate 33 is open during generation of the timing signal to print the vertical ruled line element C. The AND gate 34 receives the signals 60 and 63 and, therefore, the AND gate 34 is open during generation of the timing signal to print the horizontal ruled line element D. The output signals developed from the parallel-to-serial converter 22, AND gates 35, 36, and the AND gates 32, 34 and 37 are applied to the OR gate 42 of which an output signal is applied to one input terminal of an AND gate 43. The other input terminal of the AND gate 43 receives the dot clock signal. That is, when the output signal of the OR gate 42 bears the logic high, the AND gate 43 develops the dot clock signal as the dot signal which is applied to the printer 14.

Figure 4B:
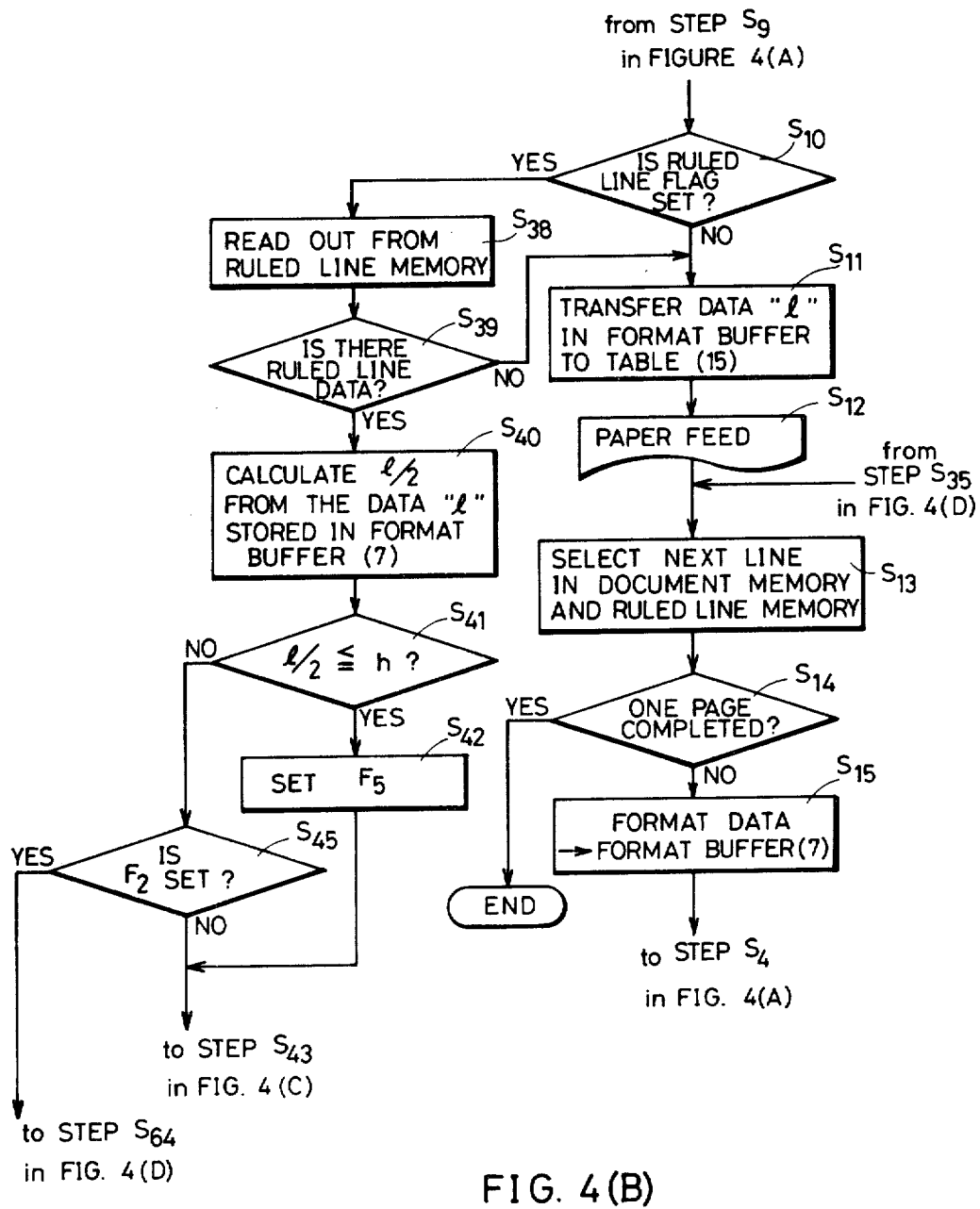
Figure 4E:
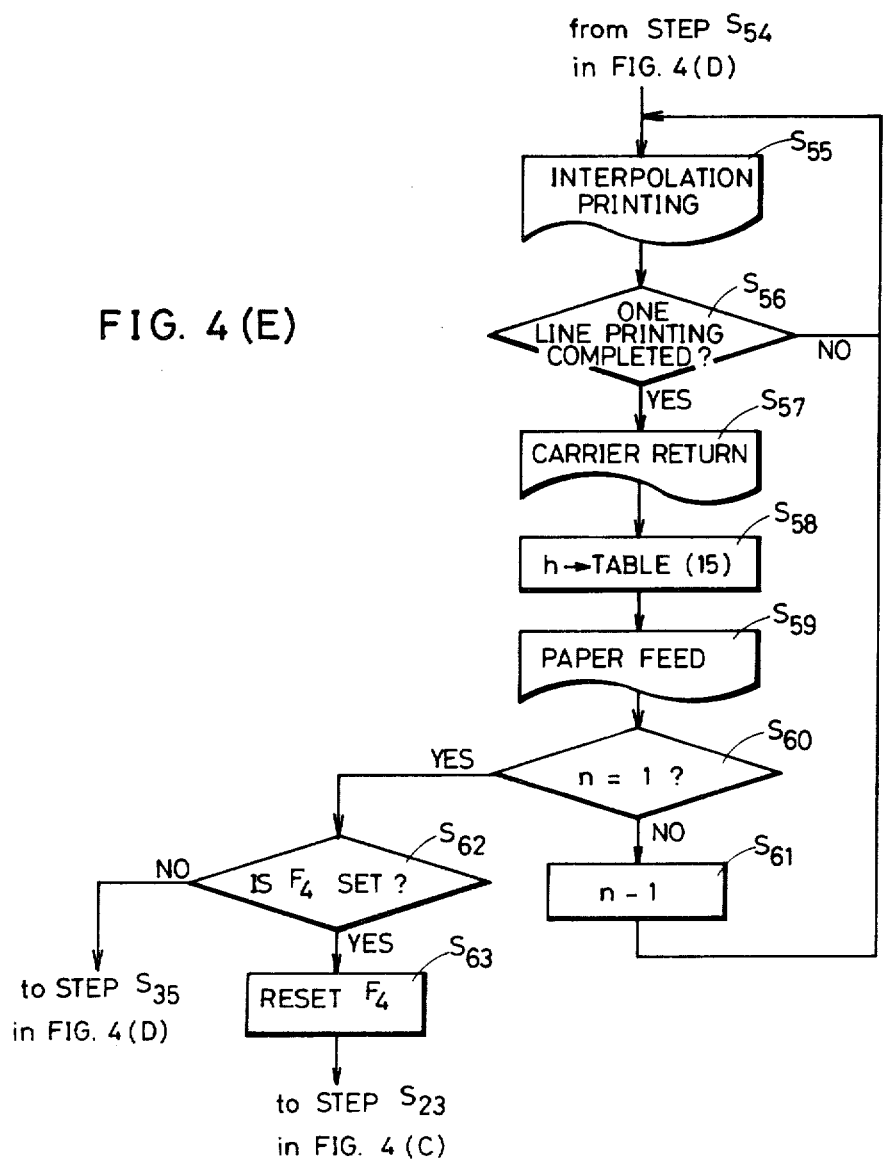

FIG. 4 is a flow chart for explaining an operational mode of the word processing apparatus of the present invention. FIG. 5 shows a sample of the printout. An operational mode will be described with reference to FIGS. 4 and 5.

Now assume that the document memory 2 and the ruled line memory 4 store the document data and the ruled line data, respectively. A desired page to printed is entered from the key input panel 1.

First, an operation will be described when the ruled line data is not included in the selected page. At the first step $S_1$, data of the selected page stored in the document memory 2 and the ruled line memory 4 is selected. Since the ruled line data is not included in the selected page, the ruled line flag 8 is reset. At the following step $S_2$, the document format such as the line space distance "l" memorized in the document memory 2 is transferred to the format buffer 7. The reset state of the ruled line flag 8 is detected at a step $S_3$ to set the flag $F_3$ at a step $S_4$. The document data of one line is read out from the document memory 2 and is transferred to the output buffer 6 in accordance with the print format at a step $S_5$. At the following step $S_6$, the print instruction is developed to transfer the print data to the dot control circuit 13. The character pattern generator 21 included in the dot control circuit 13 develops the pattern data which is applied to the AND gate 43 via the OR gate 42 and the parallel-to-serial converter 22 which is activated at the step $S_4$ by the flag $F_3$. The AND gate 43 develops the dot signal in accordance with the pattern data, thereby printing a desired character by the printer 14. The operation of the steps $S_5$ and $S_6$ is repeated till the carrier return command is developed. That is, the steps $S_5$ and $S_6$ are repeated to complete the one line printing. When the carrier return command is developed, which is detected at a step $S_7$, the program is advanced to a step $S_8$ to reset the flag $F_3$. The carrier return instruction signal is developed from the ruled line control circuit 9 at a step $S_9$ in order to return the printer head of the printer 14 to the home position.

The reset state of the ruled line flag 8 is detected at a step $S_{10}$ to transfer the data representing the paper feed length "l" stored in the format buffer 7 to the table 15 at a step $S_{11}$. At the following step $S_{12}$, the printer 14 performs the paper feed operation by the selected length "l". That is, the record receiving paper is advanced by the distance $R_5$ as shown in FIG. 5. The address circuits 3 and 5 are activated at a step $S_{13}$ in order to select the data of the next line stored in the document memory 2 and the ruled line memory 4. A step $S_{14}$ is provided for detecting whether the print operation of one page is completed. When the one page printing is not completed, the document format of the selected line is transferred from the document memory 2 to the format buffer 7 at a step $S_{15}$. Then, the operation of the steps $S_4$ through $S_{13}$ is repeated. When the one page of printing is completed, the printing operation is completed. In summary, when the ruled line data is not included in the selected page, the record receiving paper is fed by the preselected distance "l" which is included in the format data.

The following is a description of operation when the horizontal ruled line data is included in a selected page. The ruled line flag 8 is in the set state which is detected at the step $S_3$. The program is advanced from the step $S_3$ to a step $S_{16}$ where the ruled line data of the first line of the selected page is read out from the ruled line memory 4. At the following step $S_{17}$, a determination is made as to whether the ruled line data is included in the data read out by the step $S_{16}$. That is, the step $S_{17}$ detects whether the ruled line should be printed on the first character line in the selected page. If a negative answer is obtained, the next line data in the ruled line memory 4 is selected at a step $S_{18}$, and the program is advanced to the step $S_4$ to perform the character print operation of the first line. When an affirmative answer is obtained at the step $S_{17}$, the flag $F_6$ is set at a step $S_{19}$. At the following step $S_{20}$, l/2 is obtained through the use of the distance "l" stored in the format buffer 7. At the following step $S_{21}$, a determination is conducted as to whether the thus obtained l/2 is smaller than or equal to the character height h (see FIG. 5).

When $l/2 \leq h$, the flag $F_5$ is set at a step $S_{22}$ and the flag $F_2$ is reset at a step $S_{23}$. Thereafter, the flag $F_1$ is set at a step $S_{24}$. Then, the ruled line data of the corresponding line stored in the ruled line memory 4 is transferred to the ruled line buffer 12 at a step $S_{25}$ in order to print the ruled line via the dot control circuit 13 and the printer 14. In this example, only the horizontal ruled line data is included in the ruled line data and, therefore, the ruled line data bears the logic "1" at the bits corresponding to the horizontal ruled line elements B and D. In response to the dot clock signal, the signal 60 is developed from the row counter 23, and the signal 63 is developed from the column counter 24. At this moment, the output signal of the AND gate 32 bears the logic high for a period for printing the horizontal ruled line element B, and the output signal of the AND gate 34 bears the logic high for a period for printing the horizontal ruled line element D. Thus, the AND gate 43 develops the dot signal for printing the horizontal ruled line elements B and D.

A step $S_{26}$ detects that the data representing the vertical ruled line element C is not included in the ruled line data. A step $S_{27}$ is provided for detecting whether the printing of one line is completed. If a negative answer is obtained, the operation of the steps $S_{25}$ and $S_{26}$ is repeated. When an affirmative answer is obtained, the flag $F_1$ is reset at a step $S_{28}$, and the carrier return operation is conducted at a step $S_{29}$. Under these conditions, the printer head is located at a position $h_1$ shown in FIG. 5. The reset state of the flag $F_2$ is detected at a step $S_{30}$ to reset the interpolation flag 16 at a step $S_{31}$. At the following step $S_{32}$, the value l/2 which is obtained at the step $S_{20}$ is transferred to the table 15 in order to feed the record receiving paper by the length l/2 at the following step $S_{33}$. Thus, the printer head is located at a position $h_2$ shown in FIG. 5. Then, the flag $F_5$ is reset at a step $S_{34}$. Since the flag $F_6$ is set by the step $S_{19}$, the set state of the flag $F_6$ is detected at a step $S_{35}$, and the program is advanced to a step $S_{36}$ where the next line data of the ruled line data stored in the ruled line memory 4 is selected. The flag $F_6$ is reset at a step $S_{37}$, and the program is advanced to the steps $S_4$ through $S_9$ to perform the character printing operation of the first line.

When the character printing operation of the first line is completed, the set state of the ruled line flag 8 is detected at the step $S_{10}$ to advance the operation to a step $S_{38}$ where the data of the corresponding line stored in the ruled line memory 4 is read out. A step $S_{39}$ determines whether the ruled line data is included in the data read out by the step $S_{38}$. If the ruled line data is not included in the selected line, the operation is advanced to the step $S_{11}$ in order to conduct the printing operation of the next character line. If the ruled line data is included in the selected line, the operation is advanced to a step $S_{40}$ where the length l/2 is calculated through the use of the line pitch l stored in the format buffer 7. The following step $S_{41}$ detects whether the calculated length l/2 is smaller than or equal to the line height h. In this embodiment, $l/2 \leq h$ and, therefore, the flag $F_5$ is set at a step $S_{42}$, and the data l/2 is transferred to the table 15 at a step $S_{43}$. Then, the record receiving paper is fed by the length l/2 at the following step $S_{44}$ ($R_2$ in FIG. 5). Accordingly, the printing position is the middle of the two character lines $h_2$ and $h_4$. The horizontal ruled line is printed at the step $S_{25}$ after conducting the operation of the steps $S_{23}$ and $S_{24}$. The horizontal ruled line is printed on the line $h_3$ which is the middle of the lines $h_2$ and $h_4$. The above-mentioned operation is repeated to print the horizontal ruled line at the middle of the two character lines.

In case where l=h, no space is provided between the character lines. Therefore, the horizontal ruled line is printed on the 24th dot position in the preceding character line.

In case where l/2>h and the ruled line includes only rhe horizontal ruled line, the operation is similar to that disclosed above. The record receiving paper is fed by l/2. The operation is advanced from the step $S_{21}$ to the step $S_{23}$ without setting the flag $F_5$. After the operation of the step $S_{41}$, the reset state of the flag $F_2$ is detected at a step $S_{45}$ to advance the operation to the step $S_{43}$.

The followings are description of the operation when the ruled line includes the vertical ruled line.

When l/2≦h, the determination of the step $S_{17}$ is conducted to detect whether the ruled line should be printed on the first character line as in the case of the above-mentioned horizontal ruled line printing. If the ruled line data exists, the ruled line printing operation is conducted without conducting the paper feed operation. Then, after completion of the first line printing operation, the operation of the step $S_{39}$ is conducted in order to detect whether the ruled line data exists. If an affirmative answer is obtained, the operation is advanced to the step $S_{40}$ to obtain the length (l/2)·(l/2)≦h is detected at the step $S_{41}$ to set the flag $F_5$ at the step $S_{42}$. The data l/2 is transferred to the table 15 at the step $S_{43}$ to feed the recor receiving paper by l/2 at the step $S_{44}$. The ruled line data is transferred from the ruled line memory 4 to the ruled line buffer 12 at the step $S_{25}$ after completion of the operation of the steps $S_{23}$ and $S_{24}$, thereby printing the ruled line. When the vertical ruled line element C is included in the ruled line data, the flag $F_2$ is set at a step $S_{46}$. Thereafter, when the one line printing of the ruled line is completed, the carrier return operation is conducted at the step $S_{29}$ and the interpolation flag 16 is set at a step $S_{47}$ because the flag $F_2$ is in the set state. The set state of the flag $F_5$ is detected at a step $S_{48}$, and the operation is advanced to the step $S_{32}$ where the data l/2 is transferred to the table 15 in order to feed the record receiving paper by the length l/2 at the step $S_{33}$. At this moment, the printer head is located at the next character print line. Then, the character printing operation is conducted.

Because the interpolation flag 16 is in the set state, the AND gate 38 in FIG. 3 functions to pass the output signal of the dot cancel counter 25. The character data is applied to the OR gate 42 via the character pattern generator 21 and the parallel-to-serial converter 22. The read control circuit 20 functions to read out the ruled line data from the ruled line buffer 12 at a timing corresponding to the character printing. Thus, the vertical ruled line element C is printed at a character position when a high level signal is applied from the ruled line buffer 12 to the AND gate 37. Since the AND gate 37 receives the signal 62 developed from the column counter 24, the AND gate 37 is opened at the 12th column dot position in order to print the vertical ruled line element C via the OR gate 42. That is, the vertical ruled line element C is printed while the character printing is conducted. At this moment, the length l/2 is smaller than the line pitch h and, therefore, the top portion of the now printed vertical ruled line element C overlaps the already printed vertical ruled line. The overlapping section is detected by the dot number converter circuit 26 so that the dot number which is obtained by substracting the overlapping dot number from twenty-four (24) is preset in the dot cancel counter 25. For example, when the overlapping dot number is six (6), the data 18 (24−6) is preset in the dot cancel counter 25. Thus, the dot cancel counter 25 performs the count operation from nineteen (19), whereby the dot cancel counter 25 develops a low level signal for the six dot period wherein the count contents are between 19 and 24. Thus, the output level of the AND gate 38 bears the low level for the first six (6) dot period to close the AND gate 37 for the first six dot period, thereby precluding the printing operation of the vertical ruled line. In this way, the overlapping printing of the vertical ruled line is precluded.

When the one line of character printing is completed in the above-mentioned manner, the program is advanced from the step $S_{10}$ to the step $S_{38}$ to repeat the above-mentioned operation. If the vertical ruled line should be printed on the next line at the same position as the preceding character line, the top portion of the vertical ruled line overlaps the bottom portion of the vertical ruled line which has already been printed during the preceding character line printing. However, since the interpolation flag 16 is in the set state, the above-mentioned operation is conducted at the step $S_{25}$ to preclude the overlapping of the vertical ruled line elements.

The following describes the system's operation when l/2>h. In this case, the operation is advanced from the step $S_{41}$ to the step $S_{45}$ and the step $S_{43}$. The flag $F_2$ is set at the step $S_{46}$ after printing the ruled line. The set state of the flag $F_2$ is detected at the step $S_{30}$, and the interpolation flag 16 is set at the step $S_{47}$. At this moment, the flag $F_5$ is in the reset state and, therefore, the operation is advanced from the step $S_{48}$ to a step $S_{49}$ where the calculation l/2÷h is conducted. The quotient n is transferred to the register 11, and the surplus m is transferred to the register 10. The following step $S_{50}$ is to detect whether the surplus m=0. If m=0, the operation is advanced to a step $S_{51}$ where the pitch h stored in the format buffer 7 is transferred to the table 15. Then, the operation n−1 (where n≧1) is conducted at a step $S_{52}$. When an affirmative answer is not obtained at the step $S_{50}$, the surplus m is transferred to the table 15 at a step $S_{53}$. That is, the step $S_{50}$ determines the first paper feed length between the surplus m and the pitch h.

The record receiving paper is fed by the value stored in the table 15 at a step $S_{54}$. A step $S_{55}$ conducts the printing operation of the interpolation line of the vertical ruled line. While printing the interpolation line, the read control circuit 20 is operated to read out the ruled line data which is memorized by the step $S_{25}$. When the code signal representing the vertical ruled line element C is read out, the AND gate 37 becomes effective to develop the signal of the logic "1" at a timing to print the vertical ruled line. Thus, the dot signal is developed from the OR gate 42 and the AND gate 43. At this moment, if the surplus m (m<h) is stored in the table 15, the above-mentioned overlap printing inhibition operation is conducted through the use of the data preset in the dot cancel counter 25. If the pitch h is stored in the table 15, the dot number converter circuit 26 functions to preset a number "24" in the dot cancel counter 25 so that the carry signal is always developed from the dot cancel counter 25. In this way, a vertical ruled line of the length of twenty-four (24) dot positions is printed.

A step $S_{56}$ is provided for detecting whether one line printing of the interpolation line is completed. The operation of the step $S_{55}$ is repeated till the one line printing of the interpolation line is completed. When the print operation of the one line interpolation vertical line is completed, the carrier return operation is conducted at a step $S_{57}$ and the pitch data h is transferred to the table 15 at a step $S_{58}$. The paper feed operation is conducted at a step $S_{59}$. A step $S_{60}$ is provided for detecting whether n=1. If a negative answer is obtained, the operation n−1 is conducted at a step $S_{61}$ to repeat the operation of the steps $S_{55}$ through $S_{59}$. That is, the printing operation of the interpolation line is conducted till n=1 where the printer head reaches the printing line of the next horizontal ruled line or the next characters. When an affirmative answer is obtained at the step $S_{60}$, the operation is advanced to a step $S_{62}$ where a determination is conducted as to whether the flag $F_4$ is in the set state. If the flag $F_4$ is set by a step $S_{64}$ after detection of the set state of the flag $F_2$ by the step $S_{45}$, the flag $F_4$ is reset at a step $S_{63}$ to return the operation to the step $S_{23}$. However, if the reset state of the flag $F_4$ is detected at the step $S_{62}$, the operation returns to the step $S_{35}$ to conduct the printing operation of the next character line.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A print control system in a word processing apparatus comprising:
    storage means for storing introduced document data and introduced ruled line data;
    a printer unit;
    read control means for reading out document data and said ruled line data stored in said storage means and supplying said read out document data and said read out ruled line data to said printer unit in a print line by print line fashion;
    vertical ruled line formation means for printing a vertical ruled line which is perpendicular to said print line, said vertical ruled line having a predetermined length; and
    interpolation means for printing an interpolation vertical line between two vertical ruled lines printed by said vertical ruled line formation means when a line spacing of the character lines is longer than a preselected value, thereby printing a continuous vertical ruled line.

2. The print control system of claim 1, said interpolation means comprising:
    memory means for memorizing a position of the vertical ruled line in the preceding print line; and
    print control means for developing a control signal for effecting a printing operation of a vertical line at said position memorized in said memory means.

3. The print control system of claim 1 or 2, wherein said printer unit comprises a dot matrix printer for printing a desired symbol in a dot matrix pattern of m×n.

4. The print control system of claim 3, further comprising:
    pitch determination means for determining said line spacing; and
    paper feed control means for feeding a record receiving paper by a predetermined distance; and
    calculation means for calculating said predetermined distance in accordance with an output signal developed from said interpolation means.

5. The print control system of claim 2, said interpolation means further comprising:
    vertical line length calculation means for calculating a desired length of said interpolation vertical line; and
    inhibition means for precluding a printing operation of said interpolation vertical line in accordance with said desired length calculated by said vertical line length calculation means, thereby precluding an overlapping of said interpolation vertical line with said vertical ruled line.

6. The print control system of claim 5, wherein said printer unit comprises an ink jet system printer for printing a desired symbol in a dot matrix fashion.

* * * * *